Oct. 13, 1970   N. L. DOUGLAS   3,533,289
WIRED THERMOMETER

Filed Dec. 16, 1968   2 Sheets-Sheet 1

INVENTOR
NORMAN L. DOUGLAS

Oct. 13, 1970   N. L. DOUGLAS   3,533,289
WIRED THERMOMETER
Filed Dec. 16, 1968   2 Sheets-Sheet 2
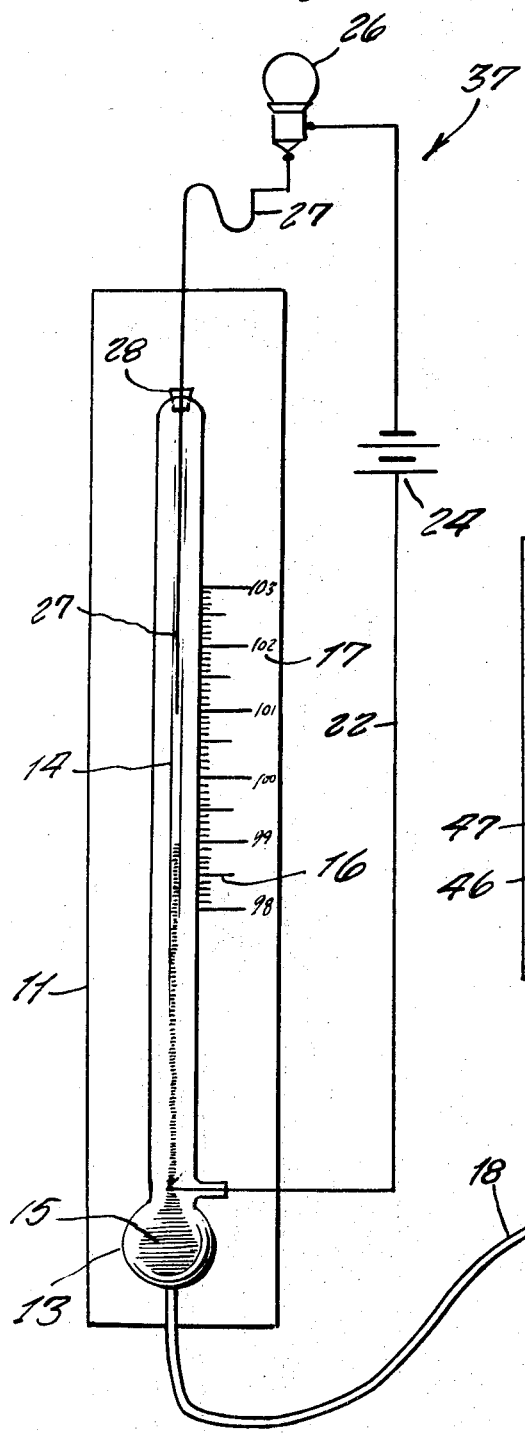
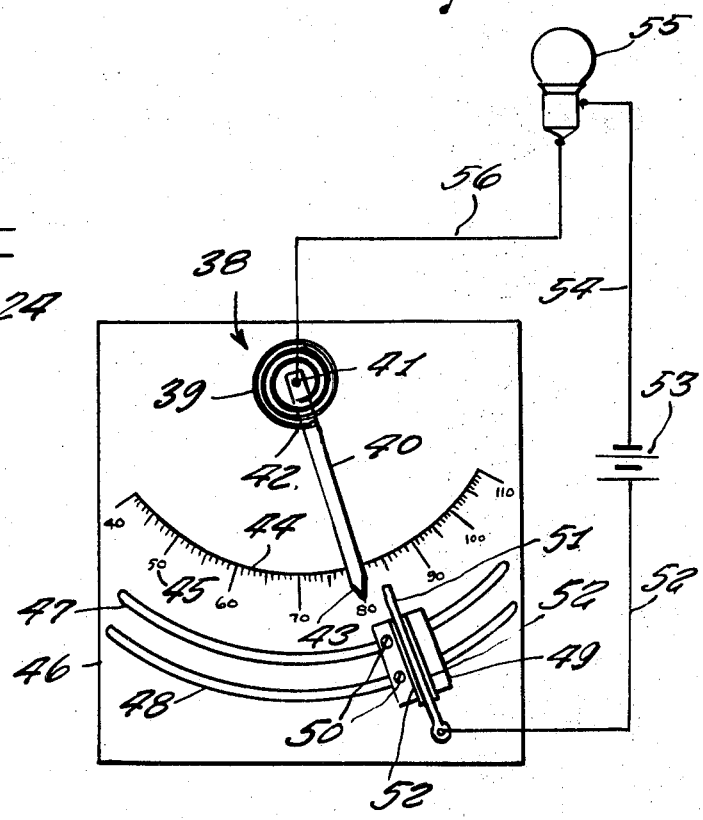
INVENTOR
NORMAN L. DOUGLAS

United States Patent Office 3,533,289
Patented Oct. 13, 1970

3,533,289
WIRED THERMOMETER
Norman L. Douglas, 119 E. Fudge St., Covington, Va. 24426
Filed Dec. 16, 1968, Ser. No. 783,996
Int. Cl. G01k 3/00, 5/16
U.S. Cl. 73—343  2 Claims

ABSTRACT OF THE DISCLOSURE

A thermometer which is wired into an alarm circuit so as to warn persons of a rising temperature. The device is adaptable for use on patients with fever as well as other purposes. The device includes a mercury thermometer having a wire electrode inserted an adjustable distance into the upper end of the mercury tube of the thermometer. The electrode is connected to an alarm and an electrical power source so that when the temperature goes above a predetermined point the alarm is set off.

---

Figure 1:
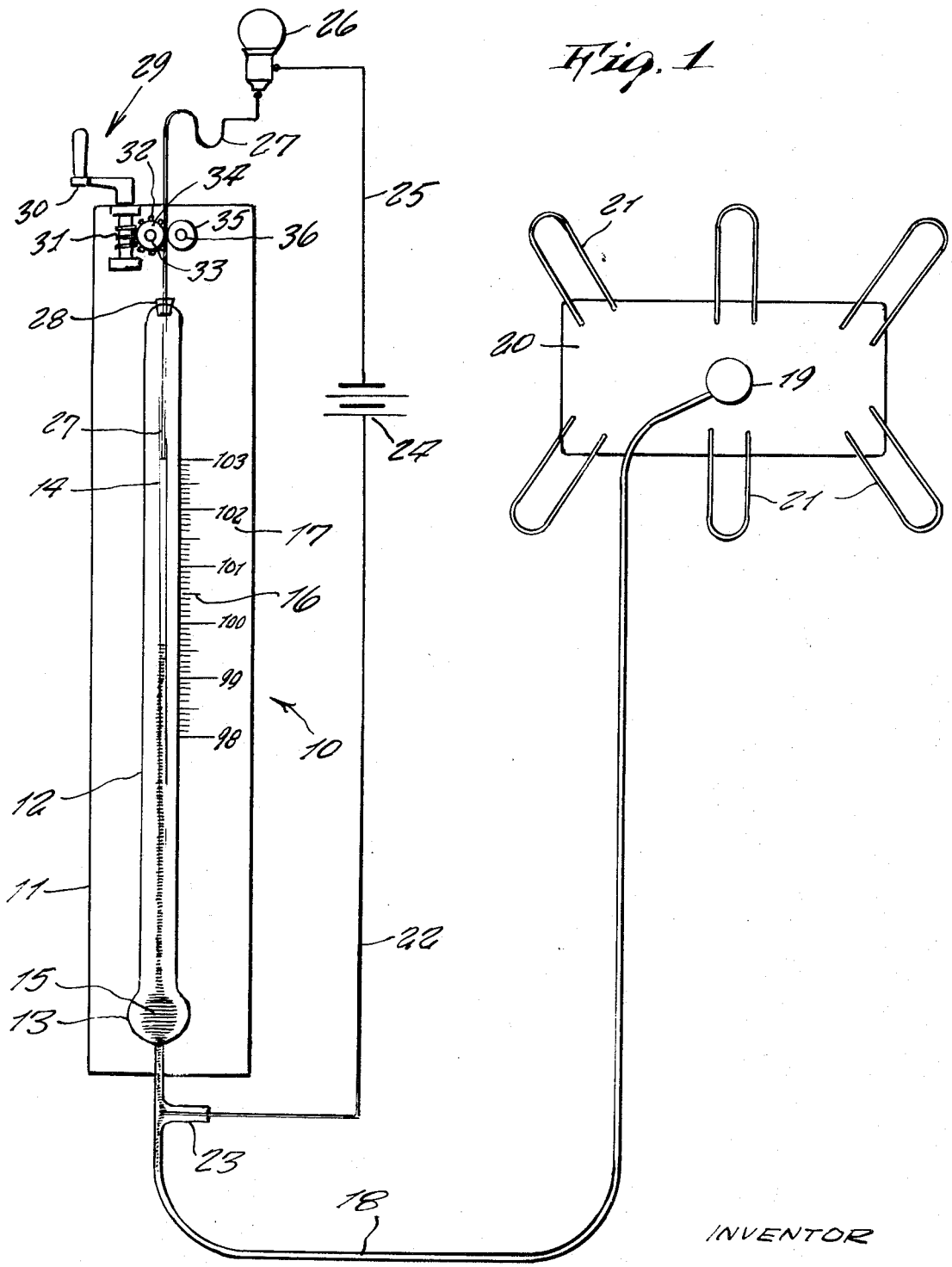

This invention relates generally to thermostatic alarms.

It is generally well known that in a sick room, a patient's fever may suddenly rise up within a few hours, such rise of fever temperature requiring generally immediate attention so that the attendant to the patient may administer medication or other attention for lowering the same. In view that an attendant may not be constantly at hand, such as during the nighttime, the attendant may not be aware of the rising fever until the following morning. This situation may of course be dangerous and is accordingly in want of improvement.

Accordingly, it is the principal object of the present invention to provide a wired thermometer which will record a person's temperature, and which has self-contained means for setting an alarm in case the temperature goes above a predetermined degree.

Another object of the present invention is to provide a wired thermometer which while being adaptable particularly for sickroom use, may be used for other purposes where the rise of a temperature beyond a predetermined degree requires instant attention, such as for exsample, a fire alarm, or the like.

Other objects of the present invention are to provide a wired thermometer which is simple in design, inexpensive to manufacture, rugged in construction, easy to use and efficient in operation.

These and other objects will be readily evident upon a study of the following specification and the accompanying drawings wherein:

FIG. 1 is a diagram showing one form of the present invention, and shown employing an adjustable temperature contact, FIG. 2 is a similar view of another form thereof, shown employing a fixed temperature contact, and FIG. 3 is a diagram showing a further modified form of the present invention.

Referring now to the drawings in detail, and more particularly to FIG. 1 thereof, the reference numeral 10 represents a wired thermometer, according to the present invention wherein there is a panel 11 upon which there is stationarily mounted a transparent glass thermometer tube 12. The tube 12 includes a hollow, enlarged bulb 13 at one end of the tube which is in communication with a central passage 14 extending longitudinally through the tube 12. A quantity of mercury 15 is contained within the bulb, the mercury extending into the passage 14 a distance upwardly according to the temperature imposed upon the mercury.

A graduated scale 16 having degreed numerals 17 is imprinted or otherwise mounted upon the panel 11, the scale being adjacent the tube 12 so that an observer may readily associate therewith the length of the mercury column within the passage 14.

The lower end of the bulb 13 is connected to a thin copper tubing 18, the opening within the tubing communicating with the interior of the bulb 13, the opposite end of the tubing communicating with a mercury storage well 19 which is to be located in the area of whose temperature is to be recorded. The well 19 may comprise a disc-shaped bulb which is mounted upon a backing panel 20 that is of a material which will reflect heat to the well 19. A plurality of feelers 21 are secured to the backing panel 20 and are used for absorbing heat from a body adjacent thereto and transmitting the body heat into the vicinity of the well 19. It will be noted that the copper tubing 18 may be of a relatively long length so that the backing panel 20 and the well 19 may be located convenient to a patient whereas the thermometer 10 is remotely loacted where it may be conveniently read by a physician, nurse or other attendant. The backing panel 20 may be made of heat conductive metal such as brass or copper and may be made flexible for purposes of comfort adjacent a patient.

It is to be noted that the mercury column fills the entire copper tube between the well 19 and bulb 13 without any space therebetween so that a change of temperature in the vicinity of the well 19 will cause the mercury column within the tube 12 to rise or fall.

A wire conductor 22 is inserted in one end into a tubular spur 23 formed on the copper tubing 18, the wire conductor 22 being thus electrically engaged with the mercury within the tubing 18. The opposite end of the conductor 22 is connected to one side of a battery 24, the opposite side of the battery being connected by a conductor 25 to one terminal of a lamp 26. It is of course understood that the lamp may otherwise comprise a bell, a buzzer or other alarm device which may be audible or visual, or both. The opposite end of the lamp 26 or other alarm device is connected by a wire conductor 27 which is inserted through a molded rubber stopper 28 at the upper end of the thermometer tube 12, the end of the wire conductor 27 being accordingly inserted into the passage 14 of the tube 12 to a selected distance for alignment with a particular selected degree indication. Thus, as shown in the drawing, for example, the lower end of the wire conductor 27 is in alignment with the 103 degree calibration of the scale 16.

Adjustment means 29 are provided mounted upon the panel 11, the adjustment means allowing vertical movement of the wire conductor 27 a relatively longer or shorter distance into the passage of the tube 12. While the adjustability means shown in the drawing comprise a crank mechanism, it is understood that such adjustability means may incorporate any other type of mechanism or simply a set screw which locks the wire conductor at a selected elevation within the passage 14. In the illustration shown, the crank 30 rotates a worm 31 that drives a worm gear 32 so as to rotate a shaft 33 supporting a roller 34. The wire conductor 27 is frictionally held between roller 34 and a roller 35 freely pivotable about a shaft 36.

In operative use, the well 19 is located in the vicinity of the patient so as to get either a rectal or oral temperature reading. The wire conductor 27 is adjusted into the thermometer tube 12 a distance corresponding to the temperature reading at which an alarm should be sounded in case the patient's temperature rises to this degree. In case the temperature of the patient climbs upwardly an excessive amount, the mercury within the bulb 19 will expand thus causing the mercury within the tube passage 14 to climb until it reaches the lower end of the wire conductor 27, thus closing an electrical circuit between the alarm or lamp 26 and the battery 24. The physician, nurse or other attendant will thus be warned to wait upon the patient.

In a modified form of the present invention, shown in FIG. 2 of the drawing, the wired thermometer 37 is of fixed temperature contact type, and accordingly does not include the adjustable means 29 illustrated in FIG. 1 of the drawing. Additionally, the wire thermometer 37 shown in FIG. 2 does not include the remote control mechanism which incorporates the mercury well 19, the backing panel 20 and feelers 21 which are located a relatively great distance away from the thermometer by means of the long copper tubing 18. In the present form of the invention, the wired thermometer is sensitive to the temperature in the vicinity of the copper tubing 18 which is crimped off at the end as shown in FIGS. 2, 8A to seal the mercury within the copper tubing and accordingly the bulb at the lower end of the tube if in the vicinity of the area whose temperature may activate the device. Such a wired thermometer accordingly would be particularly adaptable as a fire alarm or other equivalent use.

In the drawing, like parts in FIG. 2 are identified with like reference numerals of parts in FIG. 1.

In FIG. 3 of the drawing, a further modified form of wire thermometer is shown to comprise a spring thermometer 38, including a bi-metal spring 39 that is responsive to temperature. An arm 40 pivotable about a post 41 is connected to one end 42 of the spring 39, the arm 40 being accordingly pivotable in response to a temperature change. The opposite end of the arm 40 comprises a pointer 43 which is movable across an arcuate configurated graduated scale 44 having degree numerals for recording the temperature. The scale 44 is imprinted or otherwise mounted upon a panel 46. A pair of arcuate grooves 47 and 48 are formed upon the panel 46, the grooves being concentric with the post 41. A carriage 49 is moveable along the grooves 47 and 48, the carriage being selectively securable in a particular position along the grooves by means of set screws 50. The carriage carries a point 51 that is insulated respective to the carriage by means of insulation 52, the point being connected by a conductor 52 to one side of a battery 53. The opposite side of the battery 53 is connected by a wire conductor 54 to one side of a lamp 55, it being understood that the lamp may comprise any form of audible or visual alarm. The opposite side of the lamp is connected by a wire conductor 56 to the post 41, which is mounted upon the panel 46. It is to be noted that the point is in alignment to engage the end of the arm 40 if the arm pivots into its direction.

In operative use, if the temperature rises, the arm 40 will pivot thus engaging the point 51 and close a circuit to the battery and lamp 55 so to warn a person of the rising temperature.

What I now claim is:

1. A wired thermometer electrically connected to an electrical power source and an alarm system in a series circuit that signals when the temperature rises to a selected degree of danger so arranged by an attempt comprising in combination: A backing panel upon which a calibrated scale and numerals are imprinted, a transparent glass tube having a passage therethrough, an enlarged hollow bulb at a lower end of said tube connected to one end of a long copper tubing, the opposite end of said copper tubing being connected to a well mounted upon said backing panel, mercury filling said well and copper tubing and extending upwardly into the passage of said glass tube, said backing panel being of heat responsive material and being provided with a plurality of feelers for transmitting heat from a body adjacent thereto, said copper tubing having a sidewardly extending spur therefrom, a wire conductor having one end inserted into said spur for engagement with said mercury electrically, said wire conductor comprising a component of said circuit, the upper end of said thermometer glass tube having an opening therethrough and having an adjustable wire conductor inserted into said glass tube passage, said adjustable wire conductor being another component of said circuit.

2. The combination as set forth in claim 1 wherein the opposite end of said copper tubing is crimped off in order to seal the mercury within said copper tubing, the opening in the upper end of said thermometer glass tube being fitted with a moulded rubber stopper having a passage therethrough for said wire conductors, said wire conductors projecting into said tube passage a preselected distance in alignment with said calibrated scale, whereby when said copper tubing is subjected to high temperatures incident to a fire the mercury will rise to a selected degree within the tube passage and the circuit will be completed so that an alarm or signal may be activated on a switch and in a fire station showing the exact location of the fire or extreme heat.

References Cited

UNITED STATES PATENTS

| | | | |
|---|---|---|---|
| 329,698 | 11/1885 | Barry | 73—343 XR |
| 1,997,826 | 4/1935 | Krick | 73—343 XR |
| 2,502,159 | 3/1950 | Lamb et al. | 73—343 XR |

LOUIS R. PRINCE, Primary Examiner

W. A. HENRY II, Assistant Examiner

U.S. Cl. X.R.

340—227.1